INVENTORS
John Rosa &
Derek A. Paice

United States Patent Office 3,526,816
Patented Sept. 1, 1970

3,526,816
SYSTEM FOR RECOVERING SLIPPAGE POWER
IN SLIP RING INDUCTION MOTORS
Derek A. Paice, Murrysville, and John Rosa, Pittsburgh, Pa., assignors to Westinghouse Electric Corporation, Pittsburgh, Pa., a corporation of Pennsylvania
Filed Dec. 7, 1967, Ser. No. 688,925
Int. Cl. H02p 1/32
U.S. Cl. 318—226                      16 Claims

ABSTRACT OF THE DISCLOSURE

A speed control system for a wound secondary induction motor wherein a controllable DC-AC (direct current to alternating current) converter, whose DC terminals are supplied through a rectifier with rectified slip power, is employed to control speed and recover slip power. As the speed of the motor is increased, the output characteristic of the motor-rectifier arrangement is changed when the speed reaches at least one given speed to increase the $Vr/S$ ratio for all speeds above the given speed at which the output characteristic is changed. $Vr$ is the rectified slip voltage presented by the motor to the converter, and $S$ is the motor slip which may be expressed in slip frequency, or slip percentage, or per unit slip. By way of example the output characteristic is changed by changing the effective turns ratio between the primary and secondary circuits of the motor-rectifier arrangement. Changing the output characteristic in the manner described, materially reduces the required volt-ampere rating of the converter and improves the full load power factor of the motor system.

BACKGROUND OF THE INVENTION

It is a characteristic of induction motors that by virtue of slip, a portion of the input power does not appear as output power. The magnetic air gap field, rotating at synchronous speed, and the motor revolving at some lower speed, experience the same torque. The product of this torque and speed difference represents a power difference which is referred to as "slippage loss." Stated in other words, slip S, is defined as:

$$S = \frac{Ns - Nr}{Ns}$$

where
$Ns$=the synchronous motor speed and
$Nr$=the actual speed of the motor.

In the past, it has been common to apply input power to the stator winding of the induction motor, while slip rings were employed on the rotor for connection to wound rotor control circuits for speed control and to carry away the slippage power and prevent overheating of the motor windings. In some cases, the slippage power was disposed of by simply dissipating it in a large resistor or other impedance employed for speed control. In other cases, the slip power was fed to a rectifier and a controllable DC-AC converter and the slip power was disposed of by returning it either to the motor supply source or to any supply system which would accept power. Alternatively, the slippage loss was sometimes used to supplement the motor output power by feeding the rectified secondary output to drive a direct current motor coupled to the same shaft as the induction motor.

Under start-up conditions when the rotor of the induction motor is locked, and assuming that a controlled DC-AC converter is employed for speed control and recovery of slip power, only current required for starting torque will flow in the secondary winding; however the full line voltage appears across this winding. On the other hand, when the speed of the rotor approaches the synchronous speed, the voltage across the secondary rotor winding is very low while current necessary to deliver torque at full speed flows. Accordingly, the full load reactive volt-ampere rating of the converter must be almost as large as the machine load power, notwithstanding the fact that the actual power handled by the rectifier and converter at any instant may be much lower than this. Furthermore, because of the large volt-ampere rating required of the converter, the full load system power factor is only about 0.7.

In the case of loads having a torque proportional to the square of the speed, such as fans and some pumps, the maximum slip power is approximately 15% of full load rating. This occurs at about .33 slip. Thus the actual power handled by the converter is 15%, whereas its required volt-ampere rating is 100% of the maximum useful output power.

Regardless of the type of load, for a given set of system parameters, the voltage $Vr$ versus percent slip characteristic is a straight line sloping down from maximum voltage for the given set of parameters to zero voltage, maximum voltage being coincident with 100% slip and with zero speed, while zero voltage is coincident with zero slip and with 100% or synchronous speed. Thus for a given set of parameters there is a particular ratio of voltage $Vr$ to slip $S$ for all speeds.

SUMMARY OF THE INVENTION

The invention is directed to an induction motor control system wherein a motor-rectifier arrangement, comprising a wound-secondary induction motor and rectifier means associated with the motor's secondary winding system, supplies rectified slip power to a DC-AC converter, and as the motor speed is increased the rectified slip voltage $Vr$ presented by the motor-rectifier arrangement to the converter is adjusted by any suitable means when it reaches at least one given speed in order to increase the slope of the $Vr$ versus $S$ characteristic and thereby the $Vr/S$ ratio for speeds above the given speed, thus to permit a reduction of the converter rating and to provide an improved system power factor.

As an overall object, the present invention provides improved apparatus for controlling the slippage power of an induction motor by means of a converter whereby the volt-ampere rating of the slippage power control equipment is reduced and the full load power factor of the motor and control system are improved.

Another object of the invention is to provide improved apparatus of the type described wherein reduction in the volt-ampere rating of the slippage power control equipment and improvement in the system power factor are achieved by varying the $Vr/S$ ratio in a system wherein a motor rectifier arrangement, comprised of the wound-secondary induction motor and rectifier means associated with the motor secondary winding system, applies rectified slip power to a DC-AC converter for the disposition of slip power.

Another object is to provide apparatus wherein the $Vr/S$ ratio is varied by changing a parameter of the motor-rectifier arrangement.

Another object of the invention is to provide such apparatus wherein the parameter changed is the supply volts-per-turn of the motor primary windings.

Another object of the invention is to provide such apparatus wherein the parameter changed is effective turns ratio between the primary and secondary circuits of the motor.

Another object is to provide such apparatus wherein the parameter is changed when the motor reaches at least one given speed as the motor speed is increased, so that the $Vr/S$ ratio is increased for all speeds above the given speed.

Another object is to provide such apparatus wherein the parameter is changed in response to a condition of the motor system such as current, slip-voltage, speed, etc.

In accordance with one embodiment of the invention, induction motor apparatus is provided comprising a motor-rectifier arrangement including a wound-secondary induction motor with primary and secondary winding means, and means for rectifying AC slippage power appearing across the secondary winding means, a DC–AC converter connected to the output of the rectifying means, and means responsive to a condition of the motor, such as current, slip-voltage, speed, etc., for increasing the slope of the $Vr/S$ output characteristic of the motor-rectifier arrangement when the motor speed reaches at least one given speed as the speed is being increased. As shown in the examples, the change in the $Vr/S$ characteristic may be effected by (1) changing the supply volts-per-turn or (2) by changing the effective turns-ratio between the primary and secondary circuits in the motor-rectifier arrangement, or (3) by combinations of these two. The supply volts-per-turn may be altered in accordance with the first alternative given above by any suitable means, for example by switching the primary winding elements from a Y-connection at low speeds to a delta-connection at high speeds. In this case, it is preferable to dispose the primary winding on the motor stator as is conventional practice. It may be noted that changing either the number of primary turns or the primary configuration (as from delta to Y), changes not only the volts-per-turn but also the effective turns ratio.

On the other hand, the effective turns ratio may be altered in accordance with the second alternative given above by disconnecting major portions of the secondary winding from the rectifier and converter at low motor speeds while connecting progressively larger portions of the secondary winding to the rectifier and converter at high speeds. In this case, the various portions of each secondary section or element of a three-phase motor, for example, are connected together in series.

Alternatively, a plurality, for example, three, separate secondary windings can be employed, in which case only one winding will be used at low motor speeds, two windings used at medium motor speeds, and all three windings used at high speeds. In either case, when the number of effective secondary turns in series is altered, it is preferable to dispose the secondary winding system on the motor stator rather than provide switching means on a rotating member, while the primary input power is fed to the primary winding on the rotor by means of conventional slip rings.

In certain embodiments of the invention hereinafter described, switching of the secondary windings is achieved by electromechanical means, while in other embodiments, the switching is provided by means of solid-state devices entirely. As will be understood, the latter system is usually preferable in that it avoids the necessity for mechanical contacts and the like.

The above and other objects and features of the invention will become apparent from the following detailed description taken in connection with the accompanying drawings which form a part of this specification, and in which:

Before describing the specific embodiments of the invention, it would be well to first discuss the problem involved in a system wherein slip power is rectified and recovered through a DC–AC converter. Consider an induction motor having a Y-primary and a Y-secondary winding with a turns-ratio from primary to secondary of $1:n$, where $n$ is an arbitrary number, and with rated voltage and current expressed as $V_L$ and $I_L$, respectively. Under these circumstances, the maximum line secondary current will be approximately $I_L/n$ occurring at full load; while the maximum line secondary voltage will be approximately $nV_L$ occurring at locked rotor. Assuming that a three-phase induction motor is being employed, the rating of the control equipment is about $\sqrt{3V_L I_L}$, or approximately the full rating of the motor.

Hypothetically, for a loaded motor at synchronous speed, the voltage in the secondary turns is approximately zero, whereas the current is at the maximum value or $I_L/n$. Thus, there is no slippage loss, but rated current flows in the converter. Under locked rotor conditions, on the other hand, the current in the secondary turns is approximately zero whereas the full line voltage $nV_L$ is produced across these windings. Thus the converter must be rated for $nV_L$ voltage and $I_L/n$ current corresponding to $\sqrt{3V_L I_L}$ volt-ampede rating, even though $nV_L$ and $I_L/n$ do not occur simultaneously.

The ideal full load system power factor can be defined as:

$$PF = \frac{KW}{\sqrt{(KW)^2 + (KVA_R)^2}}$$

where:

W=input power
$VA_R$=reactive volt-ampere; and
K=a constant (thousands).

Assuming that the values of KW and $KVA_R$ are both 1, as would happen when full load current flows in the converter and the motor is at full speed, the power factor as determined above is about 0.7. On the other hand, if the reactive volt-amperes through the converter can be reduced to one-third at full power with the motor approaching synchronous speed, the power factor then becomes about 0.95. It can readily be seen, therefore, that by reducing the full load reactive volt-amperes the power factor of the motor and control system can be materially improved.

Figure 1:
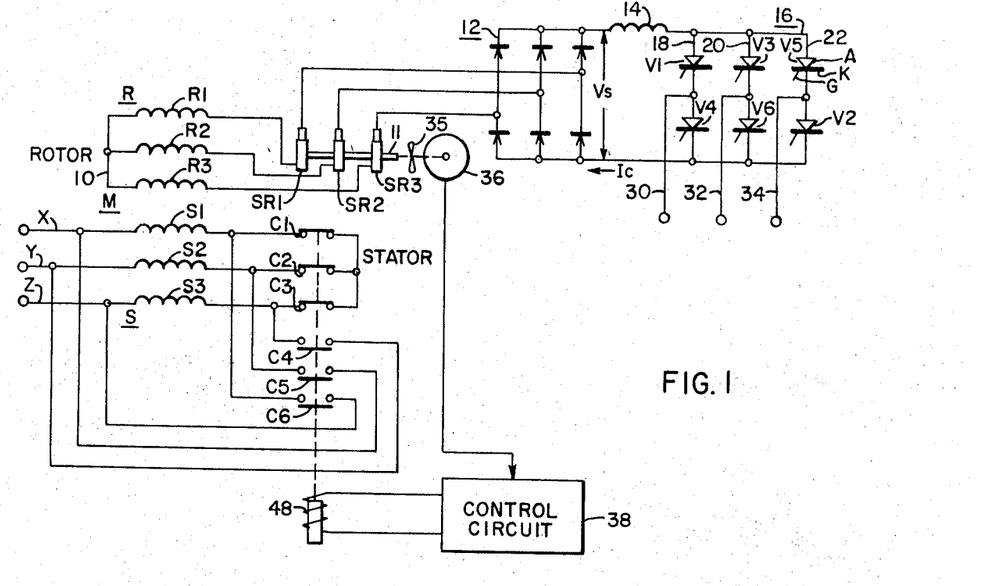
FIG. 1 is a schematic diagram of one embodiment of the invention wherein the supply volts-per-turn is altered as motor speed is increased to increase the slope of the $Vr/S$ output characteristic of the motor-rectifier arrangement.

With reference, now, to FIG. 1, one system is shown for reducing the volt-ampere rating of the converter, while improving the full load system power factor. A wound-secondary induction motor M includes a stator winding S with three sections S1, S2 and S3 connected to the three phases or power terminals X, Y and Z of a three-phase AC power source. Similarly, the motor is provided with a rotor winding R having three sections R1, R2 and R3. One end of each of the rotor winding sections R1, R2 and R3 is connected to a common point 10 to provide a Y-connection, while the other ends of the rotor winding sections are connected to slip rings SR1, SR2 and SR3, respectively, carried by the rotor shaft 11. The slip rings, in turn, are connected through conventional brushes to a three-phase full-wave rectifier 12 which rectifies the secondary slip voltage, and the output of the rectifier is connected through an inductive choke 14 to a DC-AC converter, generally indicated by the reference numeral 16.

From the above description it is readily seen that the apparatus of FIG. 1 includes a motor-rectifier arrangement comprised of (1) the motor primary circuit and (2) a secondary-rectifier arrangement for supplying rectified slip voltage to the converter 16. The secondary-rectifier arrangement in turn is comprised of the secondary winding R and the associated rectifier 12.

By way of example, converter 16 is shown as a three-phase bridge type wherein six controllable electric valves V1–V6 are connected in conventional three phase bridge configuration with one valve in each leg of the bridge, so that each DC terminal of the converter is connected to each AC line 30, 32 and 34, through a different one of the valves.

The electric valves may be of any suitable type operable in a switching mode, such as vacuum tubes, transistors, gas type controlled rectifiers (example thyratron), solid state type controlled rectifiers (example silicon controlled rectifier), etc. By way of example, the electric valves are shown as solid state controlled rectifiers each having a pair of main power electrodes A and K and a control electrode G for controlling the current flow between the main electrodes. In the example shown, the main electrode A is the anode, the main electrode K is the cathode, and the control electrode G is the gate terminal It may be seen from the disclosure that a bridge type converter may alternatively be described as having a plurality of branches conducted in parallel between the DC terminals, each branch including in series a pair of electric valves with the cathode of one valve connected to the anode of the other, and with an AC line connected to the junction therebetween. Thus in the example, converter 16 includes three parallel current paths 18, 20 and 22 connected between the output teminals of the rectifier 12. Each of the current paths in turn, includes two of the valves V connected in series, with the cathode of one valve in each current path connected to the anode of the other valve in the path as shown.

The gate terminal G of each valve is connected to a firing circuit (not shown in FIG. 1), such that the valve can be made to fire or conduct at a selected point in time for a selected period. The junctions of the two valves in each parallel path are connected to output leads 30, 32 and 34, respectively. Three-phase alternating current power will appear across these leads when properly sequenced control signals are applied to the gates G of the valves in accordance with known techniques relating to the operation of DC–AC converters. Motor speed is controlled by controlling the conduction periods of the valves. Since the construction and operation of the converter 16 is well known to those skilled in the art, no further description of it is necessary in this specification.

Leads 30, 32 and 34 may be connected to any system which will absorb power, for example the supply source of the motor, in which case the power will be disposed of by recovering it through pump-back into the supply lines. This type of slip power disposal is shown in FIGS. 2–5 wherein leads 30, 32 and 34 are shown connected to the supply leads X, Y and Z.

Referring again to FIG. 1, there is connected to the rotor shaft 11 of the motor, a fan type load 35 and a tachometer generator 36, the output of the latter being fed to a control circuit 38. The control circuit 38, in turn, will energize a power relay 48 when the speed of the motor reaches a predetermined value. Below the speed at which the relay 48 is energized, contacts C1, C2 and C3 are closed, thereby connecting the stator winding sections S1, S2 and S3 in Y-configuration. However, when the speed of the motor exceeds the predetermined value determined by the control circuit 38, contacts C1, C2 and C3 will open while contacts C4, C5 and C6 close, thereby connecting the winding sections S1, S2 and S3 in delta-configuration. The control circuit 38 may, for example, be a voltage sensitive relay circuit that will energize the power relay 48 when the output voltage of tachometer generator 36 rises to a particular value corresponding to a predetermined speed value, and will de-energize relay 48 when the tachometer voltage drops below that particular value.

Figure 6:
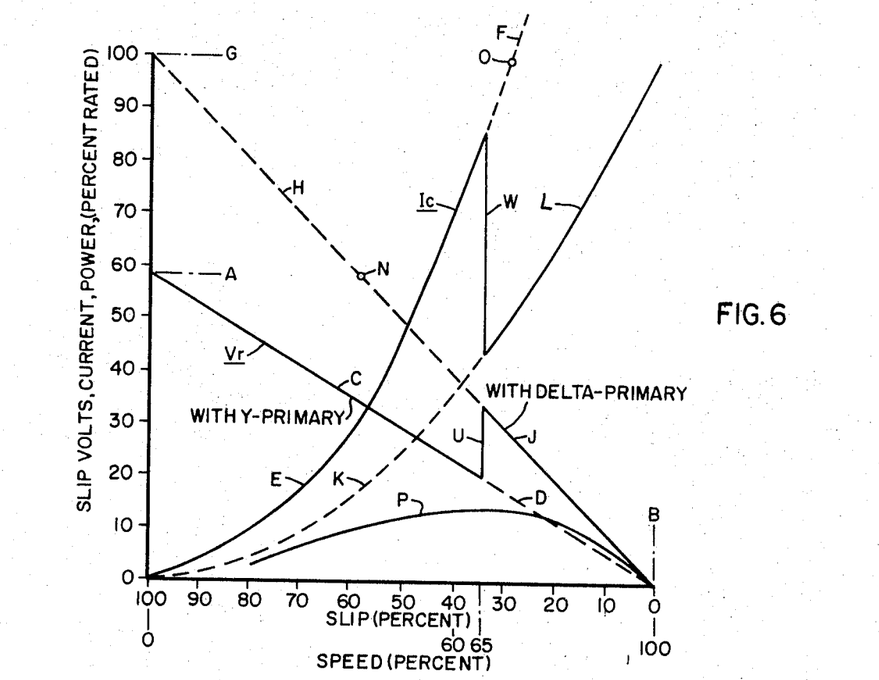
FIG. 6 is a graph illustrating certain relations in the system of FIG. 1.

At low speeds, with the winding sections S1, S2 and S3 connected in Y-configuration, the full line-to-line voltage appears across two of the winding sections in series, thereby providing a first or reference value of supply volts-per-turn in the motor and a first or reference $Vr/S$ output characteristic for the motor-rectifier arrangement as illustrated in FIG. 6, which depicts certain relations in the apparatus of FIG. 1.

In FIG. 6, the point A is the maximum value of $Vr$ developed with the motor primary connected in Y-configuration. $Vr$, as stated hereinbefore, is the rectified slip voltage supplied by the motor-rectifier arrangement to the converter 16. In FIG. 1, it is the voltage output of rectifier 12. The maximum value of $Vr$ for any given set of parameters of the motor-rectifier arrangement occurs at maximum or 100% slip which occurs at zero motor speed. The minimum value of $Vr$ for any given set of parameters occurs at zero slip which occurs at synchronous or 100% motor speed. Point A is at about the 58% mark along the voltage scale of the chart in FIG. 1. Point B marks the point of zero slip and synchronous speed along the slip and speed scales in FIG. 6. A straight line drawn between points A and B represents the $Vr$ versus slip characteristic of the motor-rectifier arangement in FIG. 1 for the Y-primary case. The curve of this characteristic is constituted by straight curve sections C (solid) and D (dotted). As can be seen it has a certain constant slope, so that for all speeds the ratio of $Vr/S$ is constant. The power curve of the converter 16 when the system is driving a fan type load is shown at P in FIG. 6 and is expressed in percentage of rated load handled by the motor. As can be seen, the maximum power handled by the converter 16 is about 15% of the motor rated power.

Concomitant with the $Vr/S$ rectified output characteristic is the current characteristic which for the Y-primary case is constituted by continuous curve sections E (solid) and F (dotted), and which shows that for each speed there is a particular Ic current to slip ratio. Ic is the DC link current flowing between the rectifier and the converter.

Assume for example that 65% on the speed scale of FIG. 6 is the predetermined value of motor speed above which control circuit 38 operates relay 48 to switch the motor primary from Y to delta-configuration. With the delta-primary configuration, the full line-to-line supply voltage appears across a single primary winding section and the supply volts-per-turn in the primary winding are increased above the aforementioned reference value provided by the Y-primary configuration. Assume for example that at zero speed the voltage $Vr$ for the delta-primary case is at point G on the voltage scale in FIG. 6, and that this also corresponds to 100% rated voltage for the motor. Thus, the $Vr$ versus slip S characteristic of the motor-rectifier arrangement is the straight line between points G and B, and constituted by the dotted section H and the solid section J. Correlative therewith is the load current curve constituted by the dotted curve section K and the solid section L. This current curve is the current versus slip characteristic for the delta-primary case and for the rated load case which by way of example were assumed to be the same.

From the above explanation and observing the chart in FIG. 6, it should now be apparent that as the motor speed is increased from zero, the output voltage $Vr$ of the motor-rectifier arrangement and the DC link current $Ic$ flowing between the rectifier 12 and the converter 16 will be along the solid curve portions C and E, respectively. When the rising speed reaches 65%, the control circuit 38 energizes relay 48 to switch the motor primary from Y to delta and correspondingly from the reference value of supply volts-per-turn to the higher value of volts-per-turn. Consequently, at this point the voltage $Vr$ and the DC link current abruptly shift to solid line J and the solid line K, respectively. Thus, for any given speed above the example transition point (65% speed) the ratio of $Vr/S$ is increased while the ratio of $Ic/S$ is correspondingly decreased. For greatest usefulness, the speed transition point should be chosen so as to fall between the speed values respectively coincident with the point N where the voltage value A occurs on $Vr/S$ curve HJ, and the point O where the 100% current value occurs on the $Ic/S$ current curve EF.

From the above it should be apparent that at low speeds the $Vr/S$ ratio is reduced and the $Ic/S$ ratio is increased, while at high speeds the $Vr/S$ ratio is increased, thereby materially decreasing the volt-ampere rating of the converter 16.

It may be noted that the total voltage $Vr$ supplied by the motor-rectifier arrangement to the converter 16 follows the solid line curve portions C, U and J, the composite $Vr$ curve being designated the curve CUJ. Likewise, the converter current $Ic$ follows the solid curve portions E, W and L, whereby the composite $Ic$ curve may be referred as the curve EWL.

Figure 2:
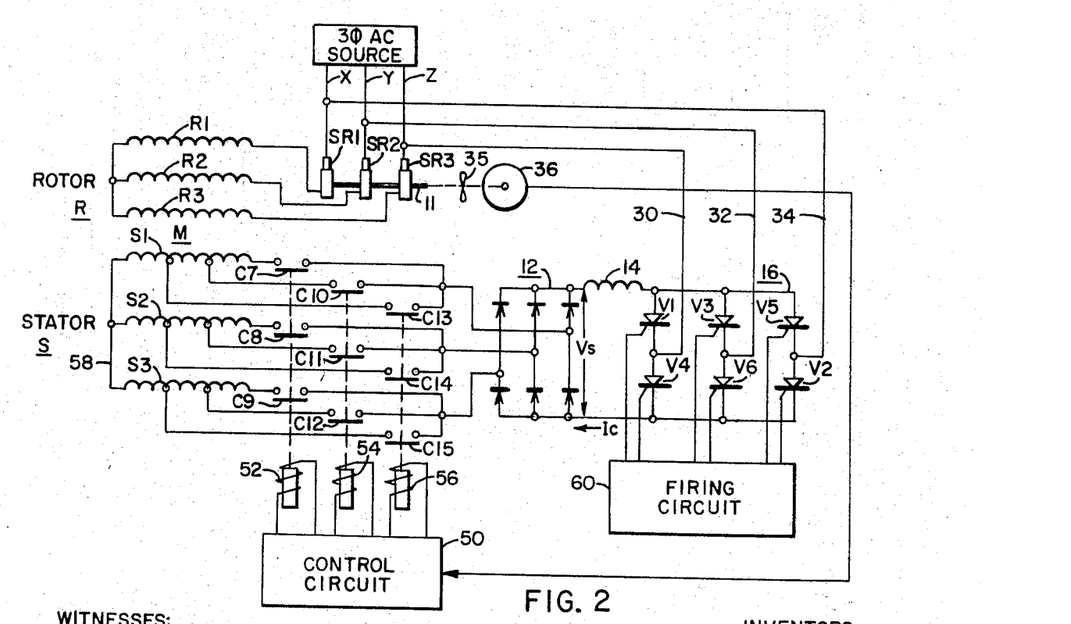
FIG. 2 is a schematic circuit diagram of another embodiment of the invention wherein input power is fed through slip rings to the primary windings on the motor rotor, while the sections of secondary winding on the stator are divided into equal series-connected parts which are selectively connected to the output rectifier and converter as the motor speed increases.

With reference now to FIG. 2, another embodiment of the invention is shown wherein elements corresponding to those shown in FIG. 1 are identified by like reference numerals. In this case, however, it will be noted that unlike most induction motors, the rotor winding sections R1, R2 and R3 are connected through slip rings SR1, SR2 and SR3 to the three phases or power terminals X, Y and Z. Thus, the rotor winding R becomes the primary winding while the stator winding S becomes the secondary winding. In this instance, the output of the tachometer generator 36 is applied to a control circuit 50 which controls the three power relays 52, 54 and 56. The relay 52 is provided with three normally open contacts C7, C8 and C9; relay 54 is provided with three normally open contacts C10, C11 and C12; while relay 56 is provided with three normally open contacts C13, C14 and C15. It will be noted that the stator sections S1, S2 and S3 are interconnected at 58 to provide a Y-connection, the same as the rotor winding.

Control circuit 50 is arranged to control relays 52, 54 and 56, to provide the functions indicated in the following operational description. Under start-up conditions, the relay 56 will be energized, thereby closing contacts C13, C14 and C15. This, in effect, connects only one-third of the winding sections S1, S2 and S3 to the input of rectifier 12. As the speed of the motor increases, a first given speed, for example 55% speed, is reached where the output of the tachometer generator 36 reaches a level where relay 56 is deenergized and relay 54 energized, thereby opening contacts C13, C14 and C15, and closing contacts C10, C11 and C12. This connects two-thirds of each of the winding sections S1, S2 and S3 to the rectifier 12. Finally, as the increasing speed of the motor reaches a second given speed, for example 70% speed, relay 54 becomes deenergized and relay 52 is energized to close contacts C7, C8 and C9, thereby connecting the entirety of the winding sections S1, S2 and S3 to the input of rectifier 12.

Figure 7:
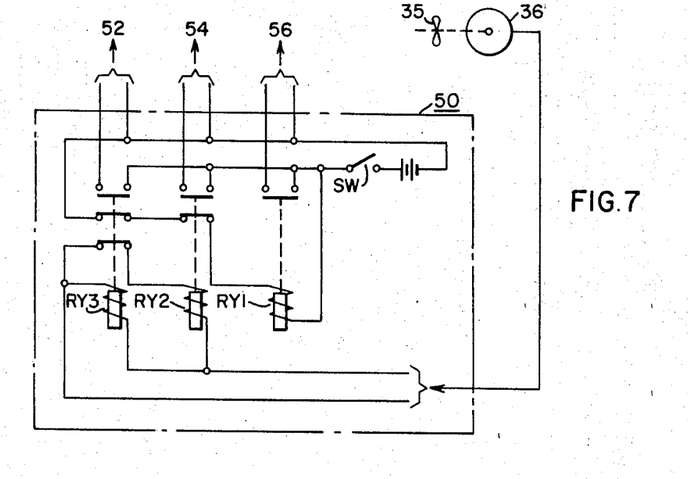
FIG. 7 is a diagram of an example of a relay control circuit which may be employed in the system of FIG. 1.

One example of control circuit 50 which will effect the above described control of relays 52, 54 and 56 is shown in FIG. 7, wherein a switch SW is closed at start-up and relays RY1, RY2 and RY3, control relays 56, 54 and 52, respectively. All relays are shown in the normal unenergized condition. Relays RY2 and RY3 are voltage sensitive relays. The pick-up voltage of relay RY2 is the tachometer 36 voltage when the motor speed reaches 55%, and the pick-up voltage of relay RY3 is the tachometer 36 voltage occurring at 70% speed. Pick-up of either of relays RY2 and RY3 drops out relay RY1, and pick-up of relay RY3 drops out relay RY1. The effect on relays 52, 54 and 55 should be obvious from an examination of the circuitry in FIG. 7. It is desirable for each of relays RY2 and RY3 to have some hysteresis between its pick-up and dropout voltages to avoid "nuisance switching" at high speed fluctuations.

From the above description of the system in FIG. 2, it should now be apparent that from start-up to 55% speed, the motor-rectifier arrangement has a $Vr/S$ output characteristic whose slope is abruptly increased when the motor speed reaches 55%, and abruptly increased again when the motor speed reaches 70%. It is also apparent that the particular parameter which was changed or adjusted at 55% and 70% speeds to effect the abrupt changes in $Vr/S$ slope, is the effective turns-ratio between the primary and secondary circuits of the motor-rectifier arrangement in FIG. 2. Of course, each increase of slope of the $Vr/S$ characteristic increases the $Vr/S$ ratio for all speeds above the transition speed at which the $Vr/S$ characteristic was changed. The overall effect is to reduce the required volt-ampere rating of the rectifier 12 and converter 16.

Figure 8:
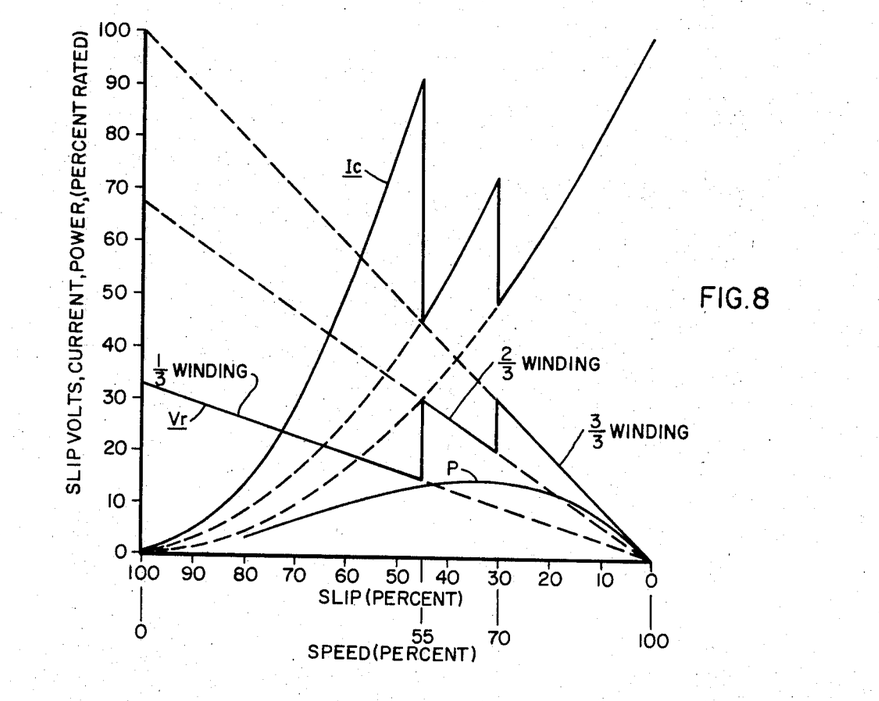
FIG. 8 is a graph illustrating certain relations in the systems of FIGS. 3, 4 and 5.

The curves $Vr$ and $Ic$ in FIG. 8 are illustrative of the $Vr/S$ and $Ic/S$ characteristics of the system of FIG. 2. Curve $Vr$ represents the $Vr/S$ output characteristic of the motor-rectifier arrangement. The portions of the $Vr$ curve marked 1/3 wdg., 2/3 wdg., and 3/3 wedg (referring to secondary winding portions) illustrate the increases in slope as the primary-secondary effective turns-ratio is decreased at 55% speed and again at 70% speed. The $Ic$ curve shows the corresponding changes in $Ic/S$ ratios for given speeds.

As shown in FIG. 2, the firing circuit for the silicon controlled rectifiers in the converter 16 is identified by the reference numeral 60; and the output leads 30, 32 and 34 from the converter 16 are connected to the input terminals or phases X, Y and Z, thereby returning the slippage power to the supply source. Because of the feedback of slip power to the supply lines, the converter 16 should operate in the synchronous or line-commutated mode, and to that end, the firing circuit 60 is synchronized with the voltage waves on supply lines X, Y and Z. To provide convenient speed control, the firing circuit 60 is arranged to provide adjustable phase control to the valves of converter 16. Since the theory and operation of line-commutated or synchronous DC-AC converters are well known, further description herein is unnecessary.

In the embodiment of FIG. 2, any practical number of switches and coil tappings of equal or of different numbers of turns can be used. However, it is convenient and preferable to use equal turn tappings such that the tappings on each phase can be made up by series connection of isolated coils wound as parallel conductors. In the case of the three equal tappings shown in FIG. 2, the converter rating becomes 33% of the motor rating if the converter currents are prevented from exceeding full load current and the ideal full load power factor becomes 0.95 as was explained above.

Figure 3:
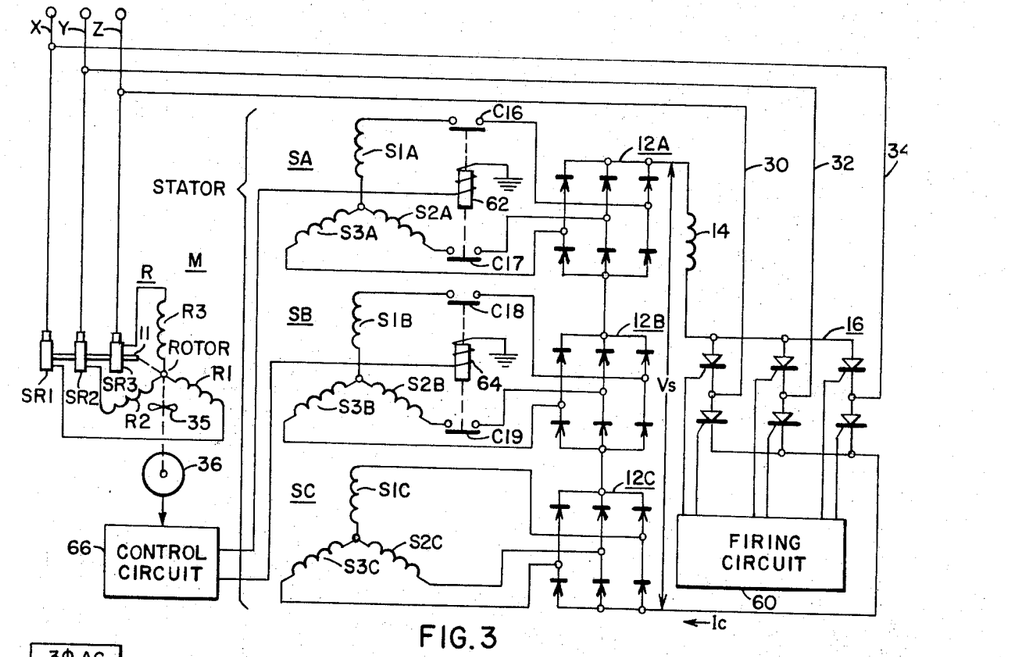
FIG. 3 is an embodiment of the invention similar to that of FIG. 2 but wherein three secondary windings are employed together with three separate rectifiers, the switching being effected by means of electromechanical devices.

In FIG. 3, there is shown another example of a system wherein the effective turns-ratio between the primary and secondary circuits of the motor-rectifier arrangement is changed when the rising motor speed reaches a first given speed (for example 55% speed), and again when a second given speed (for example 70%) is reached, thereby to increase the $Vr/S$ ratio while the motor speed is increasing, thus to permit a reduction in the volt-ampere rating of the converter 16, and an improvement in the system power factor.

With reference, now, to FIG. 3, the embodiment of the invention shown therein again employs a Y-connected rotor winding R. The rotor windings are connected through slip rings SR1, SR2 and SR3 to the three input phases X, Y and Z of a three-phase power supply. In this case, however, the stator winding system is divided into three physically parallel and equal Y-connected windings SA, SB and SC, each provided with a separate output rectifier. Winding SA comprises sections SA1, SA2 and SA3 connected to a separate output rectifier 12A. Winding SB comprises sections SB1, SB2 and SB3 connected to a separate output rectifier 12B. Finally, winding SC includes sections SC1, SC2 and SC3 connected to a third separate rectifier 12C. The rectifiers 12A, 12B and 12C, all comprising three-phase full-wave rectifiers, are connected in series between the DC input terminals of the converter 16.

Associated with secondary winding SA is a relay 62 having a pair of normally open contacts C16 and C17 which, when open, disconnect winding SA from its associated rectifier 12A. Similarly, secondary winding SB is normally disconnected from its associated rectifier 12B by means of normally open contacts C18 and C19 of a relay 64.

A control circuit 66 responsive to tachometer generator 36, is arranged to provide the hereinafter described operation of relays 64 and 62 in response to the motor reaching a first given speed, for example 55% speed, and a second given speed, for example 70% speed.

Under start-up conditions, and at low speeds up to 55% speed, relay coils 62 and 64 will be deenergized, such that only the secondary winding SC is connected through rectifier 12C to converter 16. However, as motor speed increases and the output of tachometer generator 36 builds up, control circuit 66 will cause relay coil 64 to become energized when the motor speed reaches 55% speed, thereby closing contacts C18 and C19 such that the outputs of rectifiers 12B and 12C are now both applied to the input of the converter 16. Thus the primary to secondary effective turns-ratio of the motor-rectifier arrangement is decreased thereby increasing the slope of the Vr characteristic for speeds above 55% speed. Finally, as the increasing speed of the motor reaches the second given speed (70%), control circuit 66 will energize relay 62 as well as relay 64, whereby all three secondary windings are now connected to their respective rectifiers 12A, 12B and 12C. This further decreases the primary to secondary effective turns-ratio and thereby further increases the $Vr/S$ ratio for speeds above 70% speed. The overall effect, of course, is to reduce the required volt-ampere rating of the converter 16, the output of which is again applied through leads 30, 32 and 34 to the power supply terminals X, Y and Z to pump power back into the AC supply lines.

From the above it is seen that the secondary-rectifier arrangement of the motor-rectifier arrangement in the system of FIG. 3 includes three sets each including a secondary winding and an associated rectifier, so controlled that the output $Vr$ of the motor-rectifier arrangement applied to the DC terminals of converter 16 is that of one secondary winding-rectifier set at speeds below a first given speed; is that of two secondary winding-rectifier sets in series at speeds between the first and second given speeds; and is that of three secondary winding-rectifier sets in series at speeds above the second given speed. A change in number of the secondary winding-rectifier sets perforce produces a change in the primary to secondary turns-ratio of the motor-rectifier arrangement.

It may be noted that the graph of FIG. 8 is also representative of the relations obtaining in the operation of the system in FIG. 3.

Figure 4:
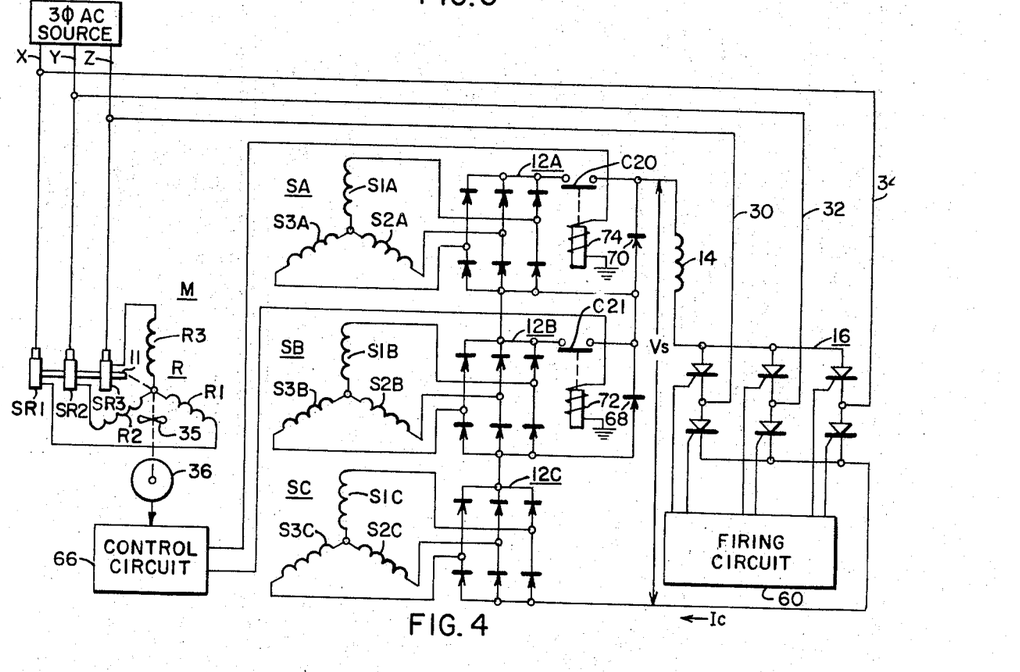
FIG. 4 is a schematic circuit diagram of another embodiment of the invention similar to that of FIG. 3 but wherein certain of the electromechanical switching functions are replaced by the use of diodes.

In FIG. 4, there is shown another embodiment wherein the effective turns-ratio between the primary and secondary circuits of the motor-rectifier arrangement is changed by changing at first and again at second given motor speeds, the number of secondary winding-rectifier sets that are connected to supply the voltage Vr to the converter 16.

The embodiment of the invention shown in FIG. 4 is similar to that of FIG. 3. For the sake of brevity, elements in FIG. 4 corresponding to those shown in FIG. 3 are identified by like reference numerals and will not again be described in detail. In this case, the three secondary windings are connected directly to their respective associated rectifiers 12A, 12B and 12C. However, the output of the secondary winding-rectifier set SA–12A is normally disconnected from the converter 16 by means of a single set of direct current contacts C20. Similarly, the secondary winding-rectifier set SB–12B is normally disconnected from the converter 16 by means of a single set of direct current contacts C21. When contacts C20 and C21 are both open, bypass diodes 68 and 70 deliver power from rectifier 12C to the converter 16. Likewise, when contacts C21 are closed but contacts C20 are open, bypass diode 70 delivers power from the rectifiers 12B and 12C to the converter 16.

The operation of the circuit of FIG. 4 is similar to that of FIG. 3 with contacts C20 and C21 both being open during start-up and low speed conditions. Thus only the output of secondary-rectifier set SC–12C is connected to the converter 16. As the speed increases, relay coil 72 is energized at a first given speed to close contacts C21 and connect the output of secondary-rectifier set 12B in series with that of set SB–12B across the input to the converter 16. As the increasing speed reaches a second given speed, relay coil 74 is energized by control circuit 66 to connect the outputs of the three secondary-rectifier sets SA–12A, SB–12B and SC–12C in series across the input to the converter 16. The advantage of the system of FIG. 4, of course, is that only two sets of direct current contacts are required as contrasted with four sets of AC contacts in the embodiment of FIG. 3.

Figure 5:
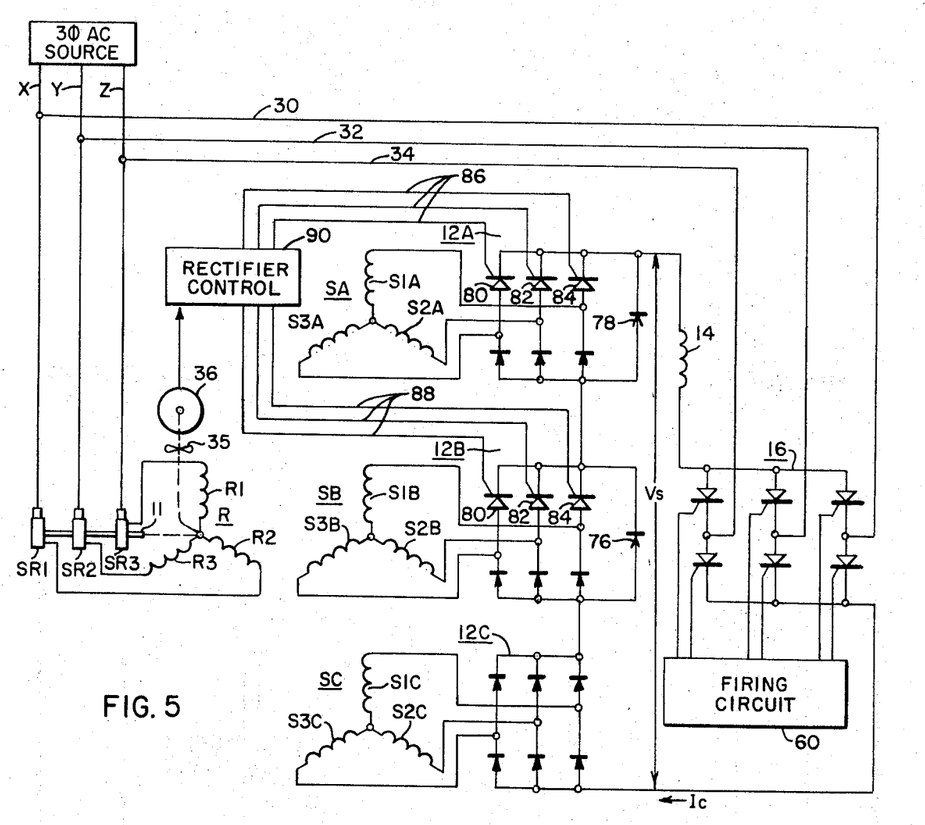
FIG. 5 is a schematic circuit diagram of still another embodiment of the invention wherein three separate secondary windings are employed together with entirely solid-state switching devices for effectively connecting or disconnecting selected ones of the secondary windings.

With reference now to FIG. 5, still another embodiment of the invention is shown wherein the output characteristic Vr of the motor-rectifier arrangement is changed by changing the effective turns-ratio between the primary and secondary circuits of the motor-rectifier arrangement when the motor speed reaches a first given speed and again when a second given speed is reached. The system in FIG. 5 is similar to the embodiments of FIGS. 3 and 4. Again, elements in FIG. 5 which correspond to those shown in FIG. 3 are identified by like reference numerals and will not be described in detail hereinafter for purposes of brevity. Like the circuit of FIG. 4, rectifiers 12A, 12B and 12C are connected directly to the outputs of the respective secondary windings on the stator. Furthermore, bypass diodes 76 and 78 are provided in shunt with rectifiers 12B and 12A to conduct current to the converter 16 from rectifier 12C when rectifiers 12A and 12B are cut off. It will be noted that the upper row of rectifiers in rectifier circuits 12A and 12B comprise solid state controlled rectifiers 80, 82 and 84, each of which has its gate electrode connected through leads 86 and 88, respectively, to a rectifier control circuit 90.

In the operation of the circuit of FIG. 5, rectifiers 12A and 12B will be cut off during start-up and at low motor speeds. However, as the speed of the motor increases, the output of tachometer generator 36 will also increase, and when the speed reaches a first given speed, for example 55% speed, the tachometer generator 36 voltage will actuate the rectifier control circuit 90 to apply gating or turn-on signals to the rectifiers 80, 82 and 84 in rectifier circuit 12B. Consequently, rectifier 12B will now be activated and in series with rectifier 12C across the input terminals of converter 16, the rectified current flowing through bypass diode 78. When the motor speed reaches a second given speed, for example 70% speed, the output of tachometer 36 will activate the rectifier control circuit 90 to apply gating signals to the rectifier 80, 82, and 84 in rectifier circuit 12A. Consequently, at this time, all three rectifier circuits 12A, 12B and 12C will be in series across the input to converter 16. The advantage of the circuit of FIG. 5, of course, is that the control system is entirely solid state and no mechanical contacts whatever are required.

The graph in FIG. 8 is also illustrative of relations occurring during the operation of the systems in FIGS. 4, 5 and 6, in which case the terms 1/3 wdg., 2/3 wdg., and 3/3 wdg., refer to secondary winding groups SC, SC+SB, and SC+SB+SA, respectively.

It should be apparent that in each of the systems of FIGS. 3, 4 and 5 there are three secondary-rectifier sets, and that at speeds below a first given speed (55% speed) the output of only one set is effectively connected to the converter; and at speeds between the first (55%) and second (70%) given speeds, the outputs of only two sets are effectively connected to the converter; and at speeds above the second given speed, the outputs of all three sets are effectively connected to the converter.

Referring back to FIG. 1, it may be noted that changing the primary winding from Y-configuration to delta-configuration not only increases the supply volts-per-turn of the primary, but also decreases the primary to secondary effective turns-ratio.

Although the invention has been shown in connection with certain specific embodiments by way of example, it will be readily apparent to those skilled in the art that various changes in form and arrangement of parts may be made to suit requirements without departing from the spirit and scope of the invention.

We claim as our invention:

1. In an induction motor control system:
    (A) a motor-rectifier arrangement comprising
        (a) input circuit means for receiving AC,
        (b) output circuit means,
        (c) an induction motor having primary winding means and wound secondary winding means, said primary winding means being connected to said input circuit means,
        (d) and rectifier means associated with said secondary winding means for rectifying slip power generated in the secondary winding means to provide a rectified slip voltage in said output circuit means;
    (B) DC–AC converter means having DC terminals and AC terminals;
    (C) means for applying said rectified slip voltage to said DC terminals of the converter means; and
    (D) control means for selectively effecting at least two different operating modes for said motor-rectifier arrangement each providing a differently sloped rectified slip voltage/slip characteristic of said motor, one of said operating modes providing for any given motor speed a higher rectified slip voltage/slip ratio than is provided by another of said modes, said control means having means for effecting said another mode of operation for motor speeds below a given speed, and for effecting said one mode of operation for motor speeds above said given motor speed, said given motor speed being between zero and maximum speeds.

2. The combination of claim 1 wherein said control means is responsive to a condition of said motor-rectifier arrangement.

3. The combination of claim 1 wherein said converter AC terminals are coupled to said input circuit means.

4. The combination of claim 1 wherein said control means comprises means for decreasing the primary to secondary effective turns-ratio when the motor speed rises above said given speed.

5. The combination of claim 1 wherein said control means comprises means for increasing the supply volts-per-turn in said primary winding means when the motor speed rises above said given speed.

6. In an induction motor control system, the combination of an induction motor having primary winding means and wound secondary winding means, supply means for applying input alternating current power to said primary winding means, means for rectifying alternating current slippage power appearing across said secondary winding means, a DC–AC converter connected to the output of said rectifying means, and control means for increasing the supply volts-per-turn in the motor primary winding means as the motor speed is increased from below to above a given speed.

7. The combination of claim 6 wherein the output of said converter is coupled to said supply means.

8. The combination of claim 6 wherein said control means is responsive to a condition of said motor.

9. The combination of claim 6 wherein said induction motor is of the three-phase type having three primary winding sections, and wherein said control means includes switching means having a first switching position effective at low motor speeds for connecting said primary windings in a Y-connection and a second switching position effective at higher speeds for connecting said primary windings in a delta connection.

10. In an induction motor control system
    (A) an induction motor having primary winding means and wound secondary winding means
    (B) rectifier means associated with said secondary winding means for rectifying slip power generated in the secondary winding means
    (C) DC–AC converter means having DC terminals and AC terminals, the DC terminals being coupled to the output of said rectifying means
    (D) and control means for increasing the primary to secondary effective turns-ratio of the motor when the motor speed rises above a given speed between zero and synchronous speeds.

11. The combination of claim 10 wherein said control means is responsive to a condition of said motor.

12. The combination of claim 10 which further includes AC supply means connected to said primary winding means, and wherein said AC terminals of the converter means are coupled to said AC supply means.

13. The combination of claim 10 wherein said secondary winding means includes at least one winding section having taps spaced along its length, and said control means includes switch means for selectively connecting said taps to said rectifying means.

14. The combination of claim 13 wherein there are three winding sections in the secondary winding means connected in a Y-configuration with one end of each winding section being connected to a common point, each winding section having taps spaced along its length, and said control means includes (a) first relay means for connecting the taps nearest said common point to said rectifying means at start-up and low motor speeds, and (b) second relay means for connecting taps further removed from said common point to the rectifying means as the speed of the motor increases.

15. The combination of claim 10 wherein said secondary winding means includes a plurality of separate secondary windings, said rectifier means includes a plurality of separate rectifiers each associated with a different one of said secondary windings whereby there are a plurality of secondary-rectifier sets each including one of said secondary windings and its associated rectifier, and wherein said control means includes means for effectively connecting the output of only one of said secondary-rectifier sets to the converter means at motor speeds below said given speed, and means for effectively connecting the outputs of more than one of said secondary-rectifier sets to said converter means at speeds above said given speed.

16. The combination of claim 15 wherein there are at least three separate secondary windings, at least three separate rectifiers each associated with a different one of said secondary windings whereby there are at least three secondary-rectifier sets each including one of said secondary windings and its associated rectifier, and wherein said control means includes means for effectively connecting the output of only one of said secondary-rectifier sets to the converter means at motor speeds below said given speed means for effectively connecting the outputs of only two of said secondary-rectifier sets to said converter means, at speeds between said given speed and a higher second given speed, and means for effectively connecting the outputs of all three secondary-rectifier sets to said converter means at speeds above said second given speed.

References Cited

UNITED STATES PATENTS

| | | | |
|---|---|---|---|
| 2,519,196 | 8/1950 | Pell | 318—215 |
| 2,773,230 | 12/1956 | Emley | 318—326 |
| 3,148,320 | 9/1964 | Davis | 318—197 |
| 3,163,810 | 12/1964 | Schaefer | 318—225 |
| 3,219,898 | 11/1965 | Schaefer | 318—225 |
| 3,348,110 | 10/1967 | Koppelmann | 318—230 |
| 3,378,755 | 4/1968 | Sawyer | 318—226 |
| 3,379,947 | 4/1968 | LaLonde | 318—237 |

ORIS L. RADER, Primary Examiner

K. L. CROSSON, Assistant Examiner

U.S. Cl. X.R.

318—227, 230, 237